(12) United States Patent
Du et al.

(10) Patent No.: US 11,288,499 B2
(45) Date of Patent: Mar. 29, 2022

(54) INTERACTIVE METHOD FOR GENERATING STROKES WITH CHINESE INK PAINTING STYLE AND DEVICE THEREOF

(71) Applicant: HUAQIAO UNIVERSITY, Xiamen (CN)

(72) Inventors: Jixiang Du, Xiamen (CN); Lijie Yang, Xiamen (CN); Tianchen Xu, Xiamen (CN)

(73) Assignee: HUAQIAO UNIVERSITY, Xiamen (CN)

( * ) Notice: Subject to any disclaimer, the term of this patent is extended or adjusted under 35 U.S.C. 154(b) by 54 days.

(21) Appl. No.: 16/898,463

(22) Filed: Jun. 11, 2020

(65) Prior Publication Data

US 2020/0327316 A1     Oct. 15, 2020

Related U.S. Application Data

(63) Continuation of application No. PCT/CN2017/116182, filed on Dec. 14, 2017.

(51) Int. Cl.
*G06K 9/00* (2006.01)
*G06K 9/46* (2006.01)
(Continued)

(52) U.S. Cl.
CPC ..... *G06K 9/00416* (2013.01); *G06K 9/00436* (2013.01); *G06K 9/4652* (2013.01); *G06T 11/001* (2013.01); *G06T 11/203* (2013.01)

(58) Field of Classification Search
CPC ........ G06K 9/222; G06K 9/80; G06K 9/6254; G06K 9/48; G06K 9/4604; G06K 9/50;
(Continued)

(56) References Cited

U.S. PATENT DOCUMENTS 5,567,061 A * 10/1996 Nagata .................... G06K 15/02
345/467
5,621,868 A * 4/1997 Mizutani ............... G06T 11/001
345/595
(Continued)

FOREIGN PATENT DOCUMENTS

| CN | 1991915 A | 7/2007 |
|---|---|---|
| CN | 102354402 A | 2/2012 |
| CN | 103793930 A | 5/2014 |

OTHER PUBLICATIONS

Chu N. S. H., Tai C.-L., "MoXi: Real-Time Ink Dispersion in Absorbent Paper", ACM Transactions on Graphics, vol. 24(3), pp. 504-511, 2005(8 pages).
(Continued)

*Primary Examiner* — Amir Alavi

(57) ABSTRACT

An interactive method for generating strokes with Chinese ink painting style, includes steps: obtaining an image including a pattern as an image object; obtaining a delimiting operation delimiting at least one stroke sample on a pre-stored ink painting sample, obtaining a basic outline forming a preliminary basic path of a stroke to be generated and drawn by a user on the image object; correcting stroke outlines in the stroke sample to obtain accurate stroke samples as candidate stroke samples; using the candidate stroke samples as references to generate morphological sample groups; correcting the preliminary basic path to obtain an accurate basic path; selecting morphological samples best matching the accurate basic path in the morphological sample groups as final stroke samples; and mapping style features of the final stroke samples onto the accurate basic path to generate an output image with Chinese ink painting style.

9 Claims, 3 Drawing Sheets

(51) Int. Cl.
*G06T 11/00* (2006.01)
*G06T 11/20* (2006.01)

(58) Field of Classification Search
CPC .. G06K 9/56; G06K 9/00124; G06K 9/00416; G06K 9/00436; G06K 9/4652; G06F 3/018; G06F 3/0487; G06F 17/2863; G06T 5/001; G06T 5/30; G06T 7/0083; G06T 7/0085; G06T 11/001; G06T 11/203
See application file for complete search history.

(56) References Cited

U.S. PATENT DOCUMENTS

| | | | | |
|---|---|---|---|---|
| 5,734,748 | A * | 3/1998 | Amano | G09G 5/246 382/181 |
| 5,844,565 | A * | 12/1998 | Mizutani | G06T 15/02 345/581 |
| 5,847,712 | A * | 12/1998 | Salesin | G06T 11/001 345/582 |
| 5,852,680 | A * | 12/1998 | Yoshida | G06T 11/203 382/258 |
| 6,179,485 | B1 * | 1/2001 | Harrington | H04N 1/40012 358/1.11 |
| 6,577,314 | B1 * | 6/2003 | Yoshida | G06T 11/203 345/471 |
| 7,948,494 | B2 * | 5/2011 | Sawazaki | G06T 11/203 345/467 |
| 8,203,564 | B2 * | 6/2012 | Jiao | G09G 5/363 345/506 |
| 2003/0001864 | A1 * | 1/2003 | Charpentier | G06F 3/14 345/619 |
| 2020/0327316 | A1 * | 10/2020 | Du | G06K 9/00436 |

OTHER PUBLICATIONS

Xu S., Tang M., Lau F., et al., "Virtual Hairy Brush for Painterly Rendering", Graphical Models, vol. 66(5), pp. 263-302, 2004(40 pages).

Lu J., Barnes C., DiVerdi S., et al., "RealBrush: Painting with Examples of Physical Media", ACM Transactions on Graphics, vol. 32(4), pp. 117, 2013(12 pages).

Hertzmann A., Jacobs C. E., Oliver N., et al., "Image analogies", In: Proceedings of the 28th Annual Conference on Computer Graphics and Interactive Techniques, New York, USA, pp. 327-340, 2001(14 pages).

Xie N., Laga H., Saito S., "IR2s: interactive real photo to Sumi-e", In: Proceedings of the 8th International Symposium on Non-Photorealistic Animation and Rendering, Annecy, France, pp. 63-71, 2010(9 pages).

Dong L., Lu S. and Jin X., "Real-time Image-based Chinese Ink Painting Rendering", Multimedia Tools & Applications, vol. 69(3), pp. 605-620, 2014.

* cited by examiner

INTERACTIVE METHOD FOR GENERATING STROKES WITH CHINESE INK PAINTING STYLE AND DEVICE THEREOF

CROSS-REFERENCE TO RELATED APPLICATION

The present application is a continuation-application of International (PCT) Patent Application No. PCT/CN2017/116182, titled: INTERACTIVE METHOD FOR GENERATING STROKES WITH CHINESE INK PAINTING STYLE AND DEVICE THEREOF, filed on Dec. 14, 2017, and the entire contents of which is hereby incorporated by reference.

TECHNICAL FIELD

The present disclosure relates to a field of a non-photorealistic style transfer technology in computer graphics, and in particular to an interactive method for generating strokes with Chinese ink painting style and a device thereof.

BACKGROUND

A Chinese freehand ink painting differs from other painting types (such as Western oil painting and watercolor painting). It uses a few strokes to describe specific scene objects or scenes, expresses an artist's creative intention and artistic personality. Freehand ink painting attracts more and more people, including painting lovers who have no foundation in painting technology, to learn to create ink painting with its unique artistry. Moreover, most graphic commercial software (such as ADOBE ILLUSTRATOR, ADOBE PHOTOSHOP, CORELDRAW, etc.) have Chinese art style generation tools. However, to generate high-quality paintings usually requires professional knowledge and skills, and the conventional painting tools require complex and accurate input in drawing skills. Meanwhile, tools that applies style transfer to generate painting (such as FIG. 1 (b)) only transfer a certain painting style to a given object as a whole, and stroke shape and color of local are rarely considered.

Flower ink painting is one of main categories in Chinese ink painting, which represents an important artistic feature of oriental painting. In other words, typical pen and ink techniques used in flower ink paintings form the unique artistic charm and value of the ink painting. Strokes of the flower ink painting are either curved or straight, stiff or soft, wide or narrow, or pale or thick. Its ink color achieves various changes in dry, wet, and shades through the mixing and diffusion between water and ink. Thus the diversity and complexity of strokes and ink colors, as well as the professional skills of painting make a task of generating paintings with Chinese ink painting style challenging.

In general, non-photorealistic drawing refers to constructing different brush models to output strokes with different artistic style, and depict specific objects like hand-painting. In recent years, there are some excellent works related to non-photorealistic drawing that are worth learning from. There excellent works could be divided in to two aspects, which will be described as follows.

In one aspect, physics-based models are provided. Specifically, in order to provide users with an intuitive and natural feeling, pen-like devices simulate the physical process of painting by modeling physical properties of pens or other media. E.g., Chu and Tai [Chu N. S. H., Tai C.-L., "MoXi: Real-Time Ink Dispersion in Absorbent Paper", ACM Transactions on Graphics, vol. 24(3), pp. 504-511, 2005] provide a real-time painting system to simulate an effect of ink diffusion on paper with absorption. Meanwhile, Xu et al [Xu S., Tang M., LAU F., et al., "Virtual Hairy Brush for Painterly Rendering", Graphical Models, vol. 66(5), pp. 263-302, 2004] provides an electronic brush for Chinese calligraphy and painting, which uses only four attributes to define basic characteristics of a real brush. Further, Lu et al [Lu J., Barnes C., DiVerdi S., et al., "RealBrush: Painting with Examples of Physical Media", ACM Transactions on Graphics, vol. 32(4), page. 117, 2013] provide an interactive data-driven drawing system that synthesizes new strokes by scanned images of real media, which avoids complex physical simnulation calculations. For digital painting software, such as ADOBE BRUSH PACKAGES, ARTRAGE, COREL PAINTER, etc., users, like using a real brush, use a mouse or a digital pen to draw. However, if not trained in the operation of such virtual devices, it is complex and difficult for users without relevant painting experience to operate such devices easily and accurately.

In the other aspect, image-based models are provided. Compared with the physics-based models, the image-based models avoid large-scale calculations and complex manipulations. Specifically, in simulating Western painting, Herzmann et al [Hertzmann A., Jacobs C. E., Oliver N., et al., "Image analogies", In: Proceedings of the 28th Annual Conference on Computer Graphics and Interactive Techniques, New York, USA, pp. 327-340, 2001] adopt "image analogy" technology to process photo images to generate artistic images. However, in their experimental results, since different image areas are drawn in different styles in Chinese painting, algorithms of Herzmann et al are unable to distinguish these image areas, so the Chinese ink style result is not ideal. In simulating oriental painting, Xie et al. [Xie N., Laga H., Saito S., "IR2s: interactive real photo to Sumi-e", In: Proceedings of the 8th International Symposium on Non-Photorealistic Animation and Rendering, Annecy, France, pp. 63-71, 2010] provides a sketching-based interactive system to transform real photos into Japanese ink paintings. Further, Dong et al [Dong L, Lu S. and Jin X., "Real-time Image-based Chinese Ink Painting Rendering", Multimedia Tools & Applications, vol. 69(3), pp. 605-620, 2014] provide texture mapping and texture synthesis technology to converted images into images with Chinese ink style. However, models in the prior art that simulating the oriental painting style mainly deal with an entire image rather than the strokes that make up the image, which makes them difficult to express rich and varied artistic characteristics of Chinese ink paintings.

SUMMARY

In view of the above technical problems, in order to overcome shortcomings of the prior art, the present disclosure provides an interactive method for generating strokes with Chinese ink painting style and a device for generating strokes with Chinese ink painting style. The present disclosure provides a series of algorithms to convert guide lines drawn by users on the image into strokes in a certain Chinese ink painting style, which achieve an effect of migrating Chinese ink style strokes to the image.

To achieve the above object, the present disclosure provides an interactive method for generating strokes with Chinese ink painting style, includes steps:

obtaining an image including a pattern as an image object;

obtaining a delimiting operation delimiting at least one stroke sample on a pre-stored ink painting sample, obtaining a basic outline drawn by a user on the image object, the basic outline forming a preliminary basic path of a stroke to be generated;

correcting stroke outlines in the at least one stroke sample to obtain accurate stroke samples as candidate stroke samples; using the candidate stroke samples as references to generate morphological sample groups;

correcting the preliminary basic path to obtain an accurate basic path;

selecting morphological samples best matching the accurate basic path in the morphological sample groups as final stroke samples; and mapping style features of the final stroke samples onto the accurate basic path to generate an output image with Chinese ink painting style.

In a first optional embodiment, the step of correcting the stroke outlines in the at least one stroke sample to obtain the accurate stroke samples as the candidate stroke samples further comprises:

determining a stroke outline closest to an edge of the stroke sample in the at least one stroke sample to obtain the candidate stroke samples by opposite search algorithm; and using the candidate stroke samples as the references to generate the morphological sample groups by means of mirror paths and reverse paths. Each of the morphological sample groups comprises at least four morphological samples. The four morphological samples are, respectively, a corresponding candidate stroke sample as one of the references, a mirror stroke sample of the corresponding candidate stroke sample, a reverse path stroke sample of the corresponding candidate stroke sample, and a reverse path stroke sample of the mirror stroke sample of the corresponding candidate stroke sample.

In a second optional embodiment, the step of correcting the preliminary basic path to obtain the accurate basic path comprises:

smoothing the preliminary basic path to obtain the accurate basic path by non-uniform rational B-spline curve algorithm.

In a third optional embodiment, the step of selecting the morphological samples best matching the accurate basic path in the morphological sample groups as the final stroke samples comprises:

dividing the accurate basic path into several path portions, and selecting, using energy formulas, a respective morphological sample in each of the morphological sample groups best matching each path portions as the final stroke samples of the path portions.

In a fourth optional embodiment, the step of dividing the accurate basic path into several path portions, and selecting, using energy formulas, a respective morphological sample in each of the morphological sample groups best matching each path portions as the final stroke samples of the path portions comprises:

defining an energy term in $\ell^2$ space by the energy formulas, wherein the energy term is configured to describe an overall difference between a displacement term of a stroke outlines in the final stroke samples and a displacement term of a corresponding accurate basic path (a corresponding path portion), and make the overall difference minimize, so as to automatically select the final stroke samples.

The displacement term is configured to describe a displacement between relative position vector and stroke direction vector at any point on the stroke Outlines and relative position vector and stroke direction vector at any point on the accurate basic path.

In a fifth optional embodiment is further improved on the basis of the fourth optional embodiment, the step of mapping style features of the final stroke samples onto the accurate basic path comprises:

adjusting an aspect ratio of each of the final stroke samples to make the aspect ratios of the final stroke samples consistent with an aspect ratio of corresponding path portions.

In another optional embodiment, the step of the step of mapping style features of the final stroke samples onto the accurate basic path further comprises: rasterizing filling an area of the accurate basic path with scanning lines and filling pixels selected from the final stroke samples into the path portions corresponding to the final stroke samples by pixel-based texture mapping algorithm.

As a further improvement of the fifth optional embodiment, the pixels are limited by following constraints:

a. neighborhood pixels of $p^S$ have a color value closest to neighborhood pixels of $p^F$;

b. $p^S$ and $p^F$ are closest to their respective bone path;

c. a color value of $p^S$ is closest to an average color value of pixels surrounding $p^P$.

Where is $p^S$ a best pixel selected in a ink stroke area $p^F$ is any one of pixels in the area of the accurate basic path. $p^P$ is a pixel in the input image including the pattern. And the above constraints are measured by 3 energy terms. $E_b(p^S)$ corresponds to the constraint a and depicts a sum of the differences between color values of neighborhood pixels of $p^S$ and color values of neighborhood pixels of $p^F$.

$E_p(p^S)$ corresponds to the constraint b and depicts how close $p^S$ and $p^F$ are to their respective bone path.

$E_a(p^S)$ corresponds to the constraint c and depicts differences between an average color value of pixels in a circle centered on $p^S$ with radius R and an average color value of pixels in circle centered on $p^P$ with the radius R.

Where the three 3 energy terms satisfy following formulas:

$$\begin{cases} E_b(p^S) = \sum_{i,D\in\{S,F\}}^{\|p_i^D - p^D\|\le 1} \|\lambda(p_i^S) - \lambda(p_i^F)\| \\ E_p(p^S) = \left\| \dfrac{p^S - C^S(\tilde{t})}{r^S(\tilde{t})} - \dfrac{p^F - C^P(\tilde{t})}{r^P(\tilde{t})} \right\| \\ E_a(p^S) = \dfrac{1}{N}\left\| \sum_j^{\|p_j^S - p^S\|\le R} \lambda(p_j^S) - \sum_j^{\|p_j^P - p^P\|\le R} \lambda(p_j^P) \right\| \end{cases}$$

$\lambda(p)$ represents a color value p. $p_i^S$ is a neighborhood pixel of $p^S$. And $p_i^F$ is a neighborhood pixel of $p^F$. $C^P(\tilde{t})$ is a point closest to $p^F$ on the bone path. At a same value of $\tilde{t}$, $C^S(\tilde{t})$ is a corresponding point on the bone path in the final stroke samples. $r^S$ and $r^P$ are, respectively, half of a width of the corresponding final stroke sample. N represents number of pixels in the circle with the radius R. $p_j^S$ represents a pixel near $p^S$ in the circle. $p_j^P$ represents a pixel near $p^P$ within the specified circle of the image.

Furthermore, the step of defining an energy equation composed of the three 3 energy terms in the $\ell^1$ space and minimizing the three energy terms to get the best pixel, by pixel-based texture mapping algorithm comprises following formulas:

$$\min_{p^S \in F^S} [\alpha_1 E_b(p^S) + \alpha_2 E_p(p^S) + \alpha_3 E_a(p^S)].$$

Where $\alpha_1$, $\alpha_2$, and $\alpha_3$ represent balance weight parameters.

In the present disclosure, by correcting the stroke samples, a blank area in the delimiting operation is eliminated and the accurate outline in the stroke samples are obtained.

In the present disclosure, by correcting the preliminary basic path, the unevenness of the edge outline of the preliminary basic path are removed and the preliminary basic path is smooth.

Based on the candidate sample groups, the present disclosure generates their mirror paths, reverse paths, and mirror reverse paths, and classifies the above four kinds of samples as morphological sample groups, such that in a process of best matching with the accurate basic path, the morphology in the candidate samples is expanded, and the morphological sample groups are adapted to line forms of different accurate basic paths that facilitates the path portions to find the best matching morphological samples.

The present disclosure adopts a method of style feature mapping to map width and color features of the final stroke samples to the accurate basic path to realize an effect of replacing the accurate basic path with the final stroke samples.

Furthermore, the present disclosure provides a device for generating strokes with Chinese ink painting style. The device comprises:

an image selecting unit selecting an image including a pattern as an image object;

a stroke sample selecting unit delimiting at least one stroke sample on a pre-stored ink painting sample;

a preliminary basic path selecting unit drawing a basic outline of the pattern on the image object to form a preliminary basic path of a stroke to be generated;

a stroke sample correcting unit correcting the outline of the delimited stroke sample to obtain an accurate stroke sample as a candidate stroke sample;

a morphological sample group generating unit generating morphological sample groups with reference to the candidate stroke samples;

a preliminary basic path correcting unit correcting the preliminary basic path to obtain an accurate basic path;

a final stroke sample selecting unit selecting the morphological samples best matching the accurate basic path in the morphological sample groups as final stroke samples; and a style feature mapping unit mapping style features of the final stroke samples onto the accurate basic path to generate an output image with Chinese ink painting style.

BRIEF DESCRIPTION OF DRAWINGS

In order to explain technical solutions of the present disclosure more clearly, the drawings needed in the embodiments will be briefly described below. Apparently, the drawings in the following description are merely some of the embodiments of the present disclosure, and those skilled in the art are able to obtain other drawings according to the drawings without contributing any inventive labor. In the drawing.

DETAILED DESCRIPTION

Technical solutions in the embodiments of the present disclosure will be described clearly and completely in conjunction with the drawings in the embodiments of the present disclosure. Obviously, the described embodiments are only a part of the embodiments of the present disclosure, but not all of the embodiments. Based on the embodiments of the present disclosure, all other embodiments obtained by those ordinary skilled in the art without making creative efforts fall within the protection scope of the present disclosure.

Figure 1:
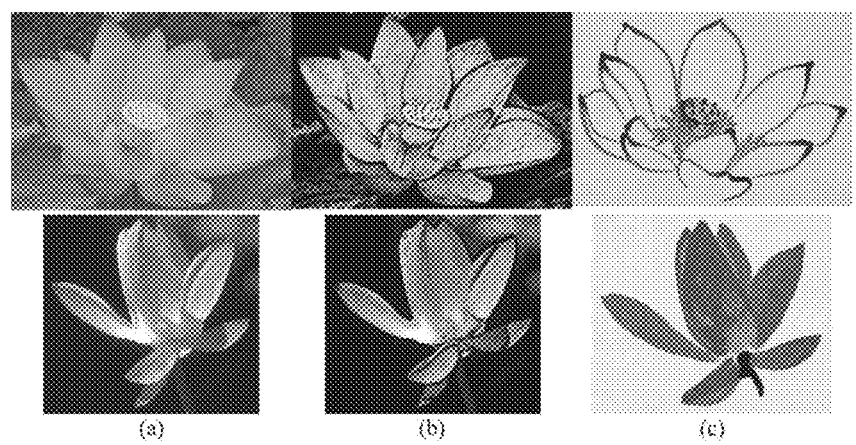
FIG. 1 is a comparison diagram of an ink image generated by the present disclosure and an ink image generated by a conventional painting tool, where (b) is an ink image generated by the conventional painting tool, and (c) is the ink image generated by the present disclosure.

The present disclosure provides a plurality of embodiments. Specifically, as shown in FIG. 1, the present disclosure provides an interactive method for generating strokes with Chinese ink painting style, comprises steps S10: Obtaining an image including a pattern as an image object.

A delimiting operation delimiting at least one stroke sample is obtained on a pre-stored ink painting sample.

The image object comprises a pattern. The pattern is selected from animals, plants, etc. Specifically, the pattern is cattle, horses, flowers, plants, etc. A subject of the pre-stored ink painting sample is selected from animals, plants, etc. The subject of the pre-stored ink painting sample is consistent with the pattern in the image object. For example, if the subject of the pre-stored ink painting sample is flowers, and the subject of the pattern must be flowers for consistency. In other words, the image object selected is a template of a basic path that a user wants to outline, and the stroke sample is the stroke style feature of the basic path that the user wants S20: Obtaining a basic outline drawn by a user on the image object, the basic outline forming a preliminary basic path of a stroke to be generated.

The basic outline drawn by the user is no need to be completely consistent with an actual outline of the pattern, and the basic outline drawn by the user may be a rough outline, and may also include user's creativity in it, such as adding lines that do not exist in the pattern as the template to the preliminary basic path.

S30: Correcting stroke outlines in the at least one stroke sample to obtain accurate stroke samples as candidate stroke samples, using the candidate stroke samples as references to generate morphological sample groups.

In a process of delimiting the at least one stroke sample, since only areas of desired strokes in the stroke sample are delimited, there are some non-stroke areas (the non-stroke areas hereto are portions that does not include lines of the stroke). Therefore, information in the areas of the stroke sample is not information of the accurate stroke outlines but also includes interference factors, which is not conducive to extract the specific stroke outlines in the stroke sample. At the same time, in order to ensure the user's efficiency and experience in selecting stroke samples, in the extraction of outlines of stroke sample, such interference factors are inevitable. In the embodiment, a stroke outline closest to an edge of the stroke sample in the at least one stroke sample is determined to obtain the candidate stroke samples by opposite search algorithm.

In the opposite search algorithm, the stroke outlines in the stroke sample represents by a three curve structure ($C^S$, $L^S$, $R^S$), where $C^S(t) \in I^S$, and is obtained by $C^S(t)=(L^S(t)+R^S(t))/2$, and its domain $F^S$ as a rough outline of the candidate stroke sample is between $L^S$ and $R^S$. $L^S$ and $R^S$ are two sides of the rough outline. Then the two sides $L^S$ and $R^S$ are fitted as curves $L^S(t)$ and $R^S(t)$, and curves $L^S(t)$ and $R^S(t)$ are divide into same number of curve segments. Assuming that end points on each curve segment are served as feature points on $L^S(t)$ and $R^S(t)$ a direction of the line from $L^S(t)$ to $R^S(t)$ is defined as a positive direction $\omega(t)$ of search. Then, direction derivatives $D_{+\omega}$ and $D_{-\omega}$ of gray value of each pixel is calculated along, respectively, the directions $\omega(t)$ and $-\omega(t)$. Finally, each pair of feature points is reset to a position of a global minimum of the direction derivative, so that the side $L^S$ and the side $R^S$ are adjusted to be the outline closest to the stroke in the stroke sample.

The candidate stroke samples are used as the references to generate the morphological sample groups by means of mirror paths and reverse path to simulate different morphology of the candidate stroke samples. Each of the morphological sample groups comprises at least four morphological samples, and the four morphological samples are a corresponding candidate stroke sample as one of the references, a mirror stroke sample of the corresponding candidate stroke sample, a reverse path stroke sample of the corresponding candidate stroke sample, and a reverse path stroke sample of the mirror stroke sample of the corresponding candidate stroke sample.

The three curve structure satisfies the formula (1), which is defined as follow:

$$\begin{cases} S_{4j}^S = (C_j^S(t), L_j^S(t), R_j^S(t)), \\ S_{4j+1}^S = (C_j^S(t), R_j^S(t), L_j^S(t)), \\ S_{4j+2}^S = (C_j^S(1-t), L_j^S(1-t), R_j^S(1-t)), \\ S_{4j+3}^S = (C_j^S(1-t), R_j^S(1-t), L_j^S(1-t)). \end{cases}$$

Where the n is the number of the at least one stroke sample. A sum of the four situations (four morphological samples) of each stroke sample compose a candidate set including 4n elements (4n morphological samples), $C=\{S_i^S | i=0, 1, \ldots, 4n-1\}$, then the four situations of each stroke sample are. $S_{4j}^S$, $S_{4j+1}^S$, $S_{4j+2}^S$, $S_{4j+3}^S$ ($j=0, 1, \ldots, n-1$).

S40: Correcting the preliminary basic path to obtain an accurate basic path.

The preliminary basic path is drawn by the user, such that the preliminary basic path is rough and makes portions of the path uneven and rough. However, in ink painting style paintings, edges of their strokes are displayed in a relatively smooth manner. In order to accurately restore the lines of paintings in ink painting style, the preliminary basic path is smoothed to obtain the accurate basic path by non-uniform rational B-spline curve algorithm in the present disclosure.

The preliminary basic path in the image object is represented by another the Curve structure ($C^P$, $L^P$, $R^P$), and the three curve structure ($C^P$, $L^P$, $R^P$) is smoothed by the non-uniform rational B-spline curve algorithm S50: Selecting morphological samples best matching the accurate basic path in the morphological sample groups as final stroke samples.

The accurate basic path is divided into several path portions, and a respective morphological sample in each of the morphological sample groups best matching each path portions are selected using energy formulas as the final stroke samples of the path portions. The shape of the candidate stroke sample is relatively simple, which makes it difficult to match the accurate basic path. The multiple candidate stroke forms generated by the morphological sample groups increase a matching probability of the path portions and the candidate stroke.

The embodiment is explained with the energy formula. an energy term $E(S_i^S)$ is defined in $\ell^2$ space by the energy formulas to describe an overall difference between a displacement term $\delta$ of $C_i^S$ and $C^P$. The displacement term is configured to describe a displacement between relative position vector and stroke direction vector at any point on the stroke outlines and relative position vector and stroke direction vector at any point on the accurate basic path. Then the overall difference is minimized, so as to automatically select the final stroke samples, which satisfy the formula (2) defined as follow:

$$\min_{S_i^S \in C} E(S_i^S) = \int_0^1 \|\delta_i^S(t) - \delta^P(t)\|^2 dt$$

Where the displacement term $\delta$ is obtained by formula (3), which is defined as follow:

$$\begin{cases} \delta_i^S(t) = C_i^S(t) - C_i^S(0) - C_i^{proj}, \\ C_i^{proj} = (C_i^S(t) - C_i^S(0)) \cdot \hat{T}_i, \\ \hat{T}_i = \frac{(C_i^S(1) - C_i^S(0))}{\|C_i^S(1) - C_i^S(0)\|}. \end{cases}$$

$C_i^S$ is any one of the basic paths. $\hat{T}_i$ is the line direction from $C_i^S(0)$ to $C_i^S(1)$. $C_i^{proj}$ is a mapping of a relative position vector $C_i^S(t)-C_i^S(0)$ of any point $C_i^S(t)$ on $C_i^S$ to $\hat{T}_i$. $\delta_i^S(t)$ is the displacement from the closest point.

S60: Mapping style features of the final stroke sample onto the accurate basic path to generate an output image with Chinese ink painting style.

As described above, the morphological samples respectively corresponding to the path portions are obtained through the energy formulas, and then original path portions are replaced with the morphological samples corresponding the path portions to generate an outline that matches the characteristics of the stroke sample selected by the user. Then an aspect ratio of each of the final stroke samples is adjusted to make the aspect ratio of each of the final stroke samples consistent with an aspect ratio of their corresponding path portions. Then the area is rasterizing filled with scanning lines and pixels selected from the final stroke samples are filled into the path portions corresponding to the final stroke samples by pixel-based texture mapping algorithm.

In a process of adjusting the aspect ratio of each of the final stroke samples to make the aspect ratio of each of the final stroke samples consistent with an aspect ratio of their corresponding path portions, a final stroke width $w^P(t)$ is related to length and curvature of the accurate basic path $C^P$ on the image object. $w^P(t)$ is obtained by the formula (4), which is defined as follow:

$$w^P(t) = \frac{k_w(t)\kappa^P(t)}{\sqrt{L^P}}$$

$k_w(t)$ is a factor that scales the width of the final stroke samples, and $L^P$ and $\kappa^P(t)$ respectively, represent the length of the accurate basic path and the curvature of the accurate basic path. $k_w(t)$ is obtained by the formula (5), which is defined as follow:

$$k_w(t) = \frac{w^S(t)\sqrt{L^S}}{\kappa^S(t)}$$

$\kappa^S(t)$ represents the curvature of the accurate basic path $C^S(t)$. $L^S$ represents the length of $C^S(t)$.

In a process of rasterizing filling an area of the accurate basic path with scanning lines and filling pixels selected from the final stroke samples into the path portions corresponding to the final stroke samples by pixel-based texture mapping algorithm, the pixels are limited by following constraints:

a. neighborhood pixels of $p^S$ have a color value closest to neighborhood pixels of $p^F$;
b. $p^S$ and $p^F$ are closest to their respective bone path;
c. a color value of $p^S$ is closest to an average color value of pixels surrounding $p^P$.

Where is $p^S$ a best pixel selected in a ink stroke area $p^F$ is any one of pixels in the area of the accurate basic path. $p^P$ is a pixel in the input image including the pattern. And the above constraints are measured by 3 energy terms $E_b(p^S)$, $E_p(p^S)$ and $E_a(p^S)$. $E_b(p^S)$ corresponds to the constraint a and depicts a sum of the differences between color values of neighborhood pixels of $p^S$ and color values of neighborhood pixels of $p^F$.

$E_p(p^S)$ corresponds to the constraint b and depicts how close $p^S$ and $p^F$ are to their respective bone path.

$E_a(p^S)$ corresponds to the constraint c and depicts differences between an average color value of pixels in a circle centered on $p^S$ with a radius R and an average color value of pixels in a circle centered on $p^P$ with the radius R.

Where the three 3 energy terms satisfy following formulas:

$$\begin{cases} E_b(p^S) = \sum_{i,D \in \{S,F\}}^{\|p_i^D - p^D\| \leq 1} \|\lambda(p_i^S) - \lambda(p_i^F)\| \\ E_p(p^S) = \left\| \frac{p^S - C^S(\tilde{t})}{r^S(\tilde{t})} - \frac{p^F - C^P(\tilde{t})}{r^P(\tilde{t})} \right\| \\ E_a(p^S) = \frac{1}{N} \left\| \sum_j^{\|p_j^S - p^S\| \leq R} \lambda(p_j^S) - \sum_j^{\|p_j^P - p^P\| \leq R} \lambda(p_j^P) \right\| \end{cases}$$

$\lambda(p)$ represents a color value of p. $p_i^S$ is a neighborhood pixel of $p^S$. $p_i^F$ is a neighborhood pixel of $p^F$. $C^P(\tilde{t})$ is a point closest to $p^F$ on the bone path. At a same value of t. $C^S(\tilde{t})$ is a corresponding point on the bone path in the final stroke sample, and $r^S$ and $r^P$ are, respectively, half of the width of the final stroke sample. N represents number of pixels in the circle with the radius R. $p_j^S$ represents a pixel near $p^S$ in the circle. $p_j^P$ represents a pixel near $p^P$ within the specified circle of the image.

The step of defining the energy equation composed of the three 3 energy terms in the $\ell^1$ space and minimizing the three energy terms to get the best pixel by pixel-based texture mapping algorithm satisfies following formula:

$$\min_{p^S \in F^S} [\alpha_1 E_b(p^S) + \alpha_2 E_p(p^S) + \alpha_3 E_a(p^S)].$$

Where $\alpha_1$, $\alpha_2$, and $\alpha_3$ represent balance weight parameters.

S70: Selecting and implanting a decorative element into the Chinese ink painting style output image according to the user's intention after the Chinese ink painting style output image is generated to generate a final painting result.

In the embodiment, the decorative element is, for example, a literati inscription, however, the present disclosure is not limited thereto.

Figure 2:
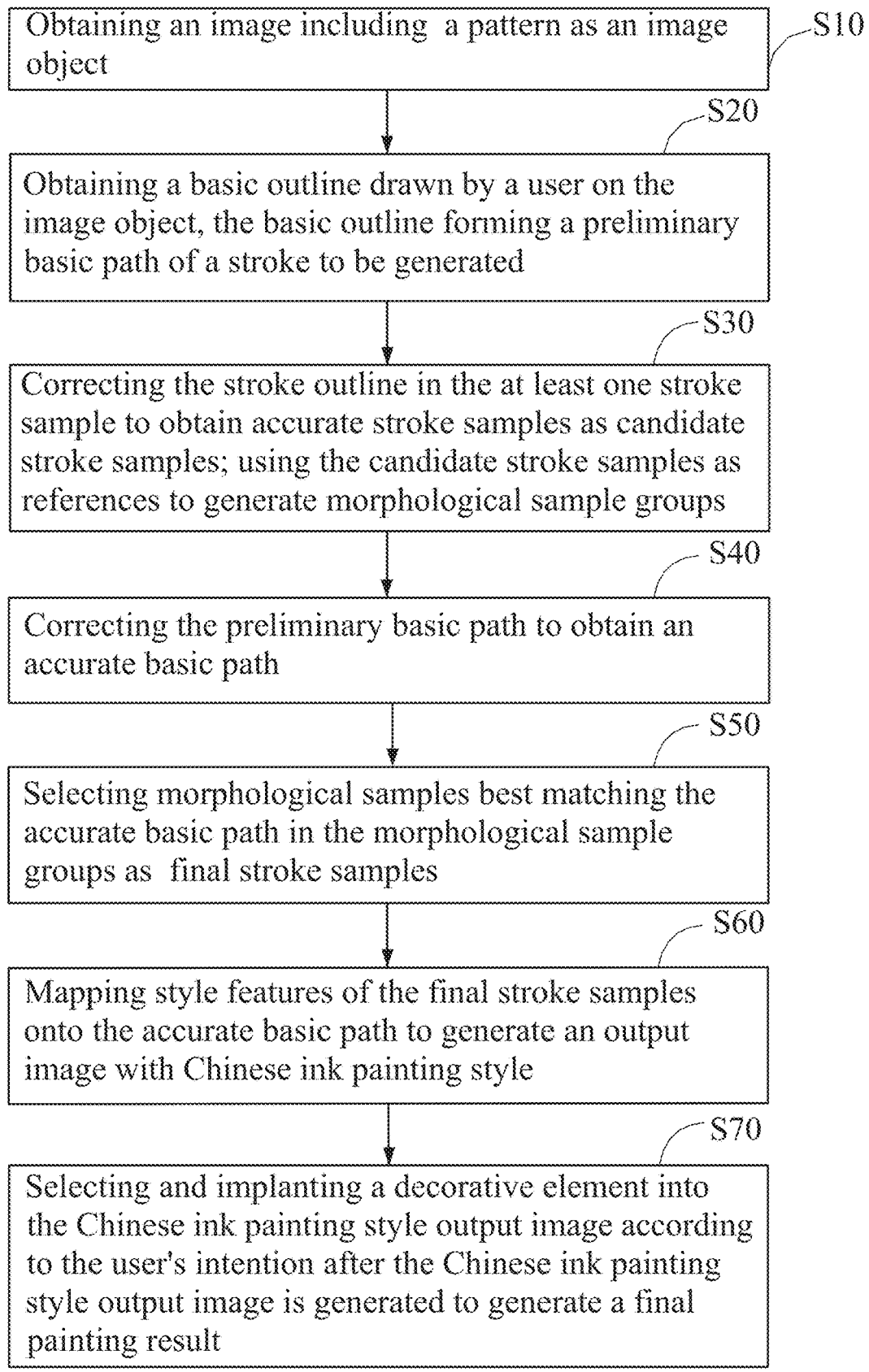
FIG. 2 is an overall flow chart of the method of the present disclosure.
Figure 3:
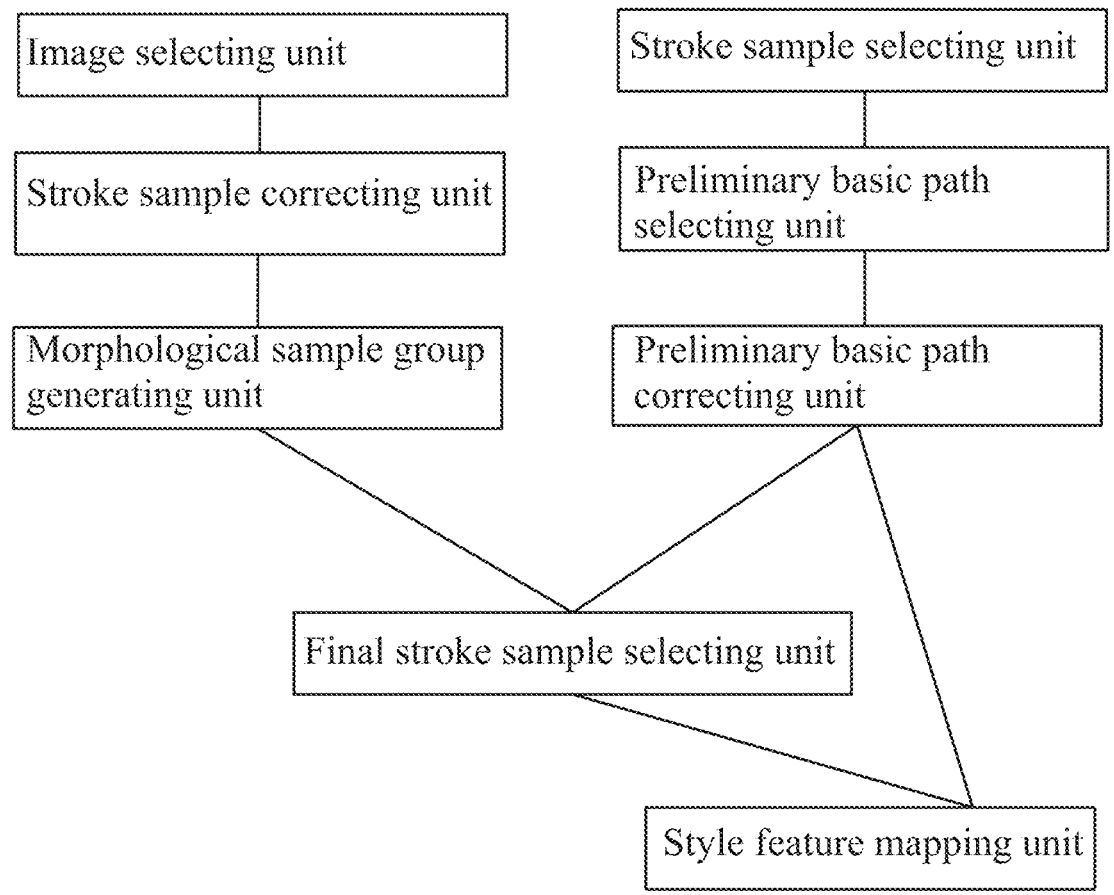
FIG. 3 is an overall schematic diagram of a device of the present disclosure.

As shown in FIGS. 2 and 3, the present disclosure provides a device for generating strokes with Chinese ink painting style. The device comprises: an image selecting unit selecting an image including a pattern as an image object;

a stroke sample selecting unit delimiting at least one stroke sample on a pre-stored ink painting sample;

a preliminary basic path selecting unit drawing a basic outline of the pattern on the image object to form a preliminary basic path of a stroke to be generated;

a stroke sample correcting unit correcting the outline of the delimited stroke sample to obtain an accurate stroke sample as a candidate stroke sample;

a morphological sample group generating unit generating morphological sample groups with reference to the candidate stroke samples;

a preliminary basic path correcting unit correcting the preliminary basic path to obtain an accurate basic path;

a final stroke sample selecting unit selecting morphological samples best matching the accurate basic path in the morphological sample groups as final stroke samples; and a style feature mapping unit mapping style features of the final stroke samples onto the accurate basic path to generate an output image with Chinese ink painting style.

The present disclosure further provides a terminal device for generating strokes with Chinese ink painting style. The terminal device comprises a processor, a memory, and a computer program stored in the memory and configured to be executed by the processor. The processor executes the computer program, which is the computer program for generating strokes with Chinese ink painting style.

In one embodiment, the computer program is divided into one or more modules, and the one or more modules are stored in the memory and executed by the processor to complete the present disclosure. The one or more modules is a series of computer program instruction segments capable of performing specific functions. The instruction segments are configured to describe the execution process of the computer program in the terminal device for generating strokes with Chinese ink painting style.

The terminal device for generating strokes with Chinese ink painting style is a computing device such as a desktop computer, a notebook, a palmtop computer, a cloud server, etc.

The terminal device for generating strokes with Chinese ink painting style may include, but is not limited to, the processor, the memory, and a display. Those skilled in the art understand that the schematic diagram is only an example of the terminal device for generating strokes with Chinese ink painting style, and does not intend to limit the terminal device for generating strokes with Chinese ink painting style, and the terminal device for generating strokes with Chinese ink painting style may include more or fewer components, or a combination of certain components or different components. For example, the terminal device for generating strokes with Chinese ink painting style may also include input and output devices, network access devices, buses, etc.

The processor may be a central processing unit (CPU), a general-purpose processor, a digital signal processor (DSP), an application specific integrated circuit (ASIC), a field-programmable gate array (FPGA), or other programmable logic devices, discrete gate or transistor logic devices, discrete hardware components, etc. The general-purpose processor may be a microprocessor or any conventional processor, etc. The processor is a control center of the terminal device generating strokes with Chinese ink painting style, which is connected with all parts of the terminal device for generating strokes with Chinese ink painting style by various interfaces and lines.

The memory is configured to store the computer programs and/or computer modules. The processor realizes various functions of the terminal device for generating strokes with Chinese ink painting style by executing computer programs and/or computer modules stored in the memory and invoking data stored in the memory. The memory mainly includes a storage program area and a storage data area. The storage program area stores an operating system, an application program that at least one function (such as sound playback function, text conversion function) required and etc. The storage data area stores data created according to the use of the terminal device (e.g. a mobile phones), such as audio data, text messages data, etc. In addition, the memory is selected from a high-speed random access memory, or a non-volatile memory (such as a hard disk, memory, plug-in hard disk, smart media card (SMC), secure digital (SD) card, flash card, at least one disk storage device, a flash memory device, or other non-volatile storage devices).

In one embodiment, if an integrated module of the terminal device for generating strokes with Chinese ink painting style is implemented in a form of a software functional unit and is sold or used as an independent product, it can be stored in a computer-readable storage medium. Based on this, all or part of the processes in the above embodiments of the method are realized by the present disclosure or by a computer program instructing relevant hardware.

The computer program may be stored in the computer-readable storage medium. When the computer program is executed by the processor, the steps of the foregoing embodiments of the method are realized. In one embodiment, the computer program includes computer program code. The computer program code is selected from a form such as source code form, object code form, executable file form, or some intermediate form. The computer-readable storage medium is: an entity or a device capable of carrying the computer program code, a recording medium, a USB flash disk, a mobile hard disk, a magnetic disk, an optical disk, a computer memory, a read-only memory (ROM), random access memory (RAM), electrical carrier signals, telecommunications signals, or software distribution media, etc. It should be noted that content contained in the computer-readable storage medium can be appropriately increased or decreased according to requirements of legislation and patent practice in jurisdictions. For example, in some jurisdictions, the computer-readable storage medium does not include electrical carrier signals and telecommunications signals.

It should be noted that the embodiments described above of the device are only schematic embodiments, where the units described as separate components may or may not be physically separated, the component displayed as a unit may or may not be a physical unit. That is, the units could be located in one place, or could be distributed to multiple network elements. Moreover, some or all of the modules may be selected according to actual needs to realize the purpose of the embodiment. In addition, in the drawings of the embodiments of the device provided by the present disclosure, there is a connection relationship between the modules and the connection is a communication connection, which is specifically realized by one or more communication buses or signal lines. Those ordinary skilled in the art are able to understand and implement without paying creative labor.

The above is some optional embodiments of the present disclosure. It should be pointed out that for those ordinary skilled in the art, without departing from the principles of the present disclosure several improvements and retouches are able to be made. These improvements and retouches are also regarded as within the protection scope of the present disclosure.

What is claimed is:

1. An interactive method for generating strokes with Chinese ink painting style, comprising:
   obtaining an image comprising a pattern as an image object;
   obtaining a delimiting operation delimiting at least one stroke sample on a pre-stored ink painting sample,
   obtaining a basic outline drawn by a user on the image object, the basic outline forming a preliminary basic path of a stroke to be generated;
   correcting stroke outlines in the at least one stroke sample to obtain accurate stroke samples as candidate stroke samples; using the candidate stroke samples as references to generate morphological sample groups;
   correcting the preliminary basic path to obtain an accurate basic path;
   selecting morphological samples best matching the accurate basic path in the morphological sample groups as final stroke samples; and
   mapping style features of the final stroke samples onto the accurate basic path to generate an output image with Chinese ink painting style.

2. The interactive method according to claim 1, wherein the step of correcting the stroke outlines in the at least one stroke sample to obtain the accurate stroke samples as the candidate stroke samples further comprises:
   determining an outline closest to an edge of the stroke sample in the at least one stroke sample to obtain the candidate stroke samples by opposite search algorithm; and
   using the candidate stroke samples as the references to generate the morphological sample groups by means of mirror paths and reverse paths; wherein each of the morphological sample groups comprises at least four morphological samples, and the four morphological samples are, respectively, a corresponding candidate stroke sample as one of the references, a mirror stroke sample of the corresponding candidate stroke sample, a reverse path stroke sample of the corresponding candidate stroke sample, and a reverse path stroke sample of the mirror stroke sample of the corresponding candidate stroke sample.

3. The interactive method according to claim 1, wherein the step of correcting the preliminary basic path to obtain the accurate basic path comprises:

smoothing the preliminary basic path to obtain the accurate basic path by non-uniform rational B-spline curve algorithm.

4. The interactive method according to claim 1, wherein the step of selecting the morphological samples best matching the accurate basic path in the morphological sample groups as the final stroke samples comprises:

dividing the accurate basic path into several path portions, and selecting, using energy formulas, a respective morphological sample in each of the morphological sample groups best matching each path portions as the final stroke samples of the path portions.

5. The interactive method according to claim 4, wherein the step of dividing the accurate basic path into several path portions, and selecting, using energy formulas, the respective morphological sample in each of the morphological sample groups best matching each path portions as the final stroke samples of the path portions, comprises:

defining an energy term in $l^2$ space by the energy formulas, wherein the energy term is configured to describe an overall difference between a displacement term of a stroke outlines in the final stroke samples and a displacement term of a corresponding accurate basic path (a corresponding path portion), and make the overall difference minimize, so as to automatically select the final stroke samples;

wherein the displacement term is configured to describe a displacement between relative position vector and stroke direction vector at any point on the stroke outlines of the final stroke samples and relative position vector and stroke direction vector at any point of the accurate basic path.

6. The interactive method according to claim 5, wherein the step of mapping style features of the final stroke samples onto the accurate basic path comprises:

adjusting an aspect ratio of each of the final stroke samples to make aspect ratios of the final stroke samples consistent with an aspect ratio of corresponding path portions.

7. The interactive method according to claim 5, wherein the step of the step of mapping style features of the final stroke sample onto the accurate basic path further comprises:

rasterizing filling an area of the accurate basic path with scanning lines and filling pixels selected from the final stroke samples into the path portions corresponding to the final stroke samples by pixel-based texture mapping algorithm.

8. The interactive method according to claim 7, wherein the pixels are limited by following constraints:
  a. neighborhood pixels of $p^S$ have a color value closest to neighborhood pixels of $p^F$;
  b. $p^S$ and $p^F$ are closest to their respective bone path;
  c. a color value of $p^S$ is closest to an average color value of pixels surrounding $p^P$;

wherein $p^S$ is a best pixel selected in a ink stroke area; $p^F$ is any one pixel in the area of the accurate basic path; $p^P$ is a pixel in the input image comprising the pattern; and the above constraints are measured by 3 energy terms $E_b(p^S)$, $E_p(p^S)$, and $E_a(p^S)$;

where $E_b(p^S)$ corresponds to the constraint a and depicts a sum of the differences between color values of neighborhood pixels of $p^S$ and color values of neighborhood pixels of $p^F$;

$E_p(p^S)$ corresponds to the constraint b and depicts how close and $p^F$ to their respective bone path;

$E_a(p^S)$ corresponds to the constraint c and depicts differences between an average color value of pixels in a circle centered on $p^S$ with a radius R and an average color value of pixels in a circle centered on $p^P$ with the radius R;

wherein the three 3 energy terms satisfy following formulas:

$$\begin{cases} E_b(p^S) = \sum_{i,D \in \{S,F\}}^{\|p_i^D - p^D\| \le 1} \|\lambda(p_i^S) - \lambda(p_i^F)\| \\ E_p(p^S) = \left\| \dfrac{p^S - C^S(\tilde{t})}{r^S(\tilde{t})} - \dfrac{p^F - C^P(\tilde{t})}{r^P(\tilde{t})} \right\| \\ E_a(p^S) = \dfrac{1}{N} \left\| \sum_j^{\|p_j^S - p^S\| \le R} \lambda(p_j^S) - \sum_j^{\|p_j^P - p^P\| \le R} \lambda(p_j^P) \right\| \end{cases}$$

$\lambda(p)$ represents a color value p; $p_i^S$ of is a neighborhood pixel of $p^S$; and $p_i^F$ is a neighborhood pixel of $p^F$; $C^P(\tilde{t})$ is a point closest to $p^F$ on the bone path; at a same value of $\tilde{t}$, $C^S(\tilde{t})$ is a corresponding point on the bone path in the final stroke samples; $r^S$ and $r^P$ are, respectively, half of a width of a corresponding final stroke sample; N represents number of pixels in the circle with the radius R; $p_j^S$ represents a pixel near $p^S$ in the circle; $p_j^P$ represents a pixel near $p^P$ within the specified circle of the image.

9. The interactive method according to claim 7, wherein the step of defining an energy equation composed of the three 3 energy terms in the $l^1$ space and minimizing the three energy terms to get the best pixel, by pixel-based texture mapping algorithm comprises following formula:

$$\min_{p^S \in F^S} [\alpha_1 E_b(p^S) + \alpha_2 E_p(p^S) + \alpha_3 E_a(p^S)];$$

wherein $\alpha_1$, $\alpha_2$, and $\alpha_3$ represent balance weight parameters.

* * * * *